(12) United States Patent
Klinder

(10) Patent No.: US 9,879,584 B2
(45) Date of Patent: Jan. 30, 2018

(54) CATALYST DEVICE, ELEMENT BOX FOR A CATALYTIC DEVICE, AND HANDLING TOOL FOR HANDLING THE ELEMENT BOX

(71) Applicant: Johnson Matthey Catalysts (Germany) GmbH, Redwitz (DE)

(72) Inventor: Kai Klinder, Bamberg (DE)

(73) Assignee: Johnson Matthey Catalysts (Germany) GMBH, Redwitz (DE)

( * ) Notice: Subject to any disclaimer, the term of this patent is extended or adjusted under 35 U.S.C. 154(b) by 236 days.

(21) Appl. No.: 14/633,325

(22) Filed: Feb. 27, 2015

(65) Prior Publication Data

US 2015/0247438 A1 Sep. 3, 2015

(30) Foreign Application Priority Data

Feb. 28, 2014 (DE) .......................... 10 2014 203 748

(51) Int. Cl.
| | |
|---|---|
| *B01D 50/00* | (2006.01) |
| *F01N 3/28* | (2006.01) |
| *B01D 53/88* | (2006.01) |
| *B25J 15/00* | (2006.01) |
| *F01N 13/18* | (2010.01) |
| *F01N 13/00* | (2010.01) |
| *B01J 35/04* | (2006.01) |
| *B01J 35/02* | (2006.01) |
| *B01J 37/02* | (2006.01) |

(52) U.S. Cl.
CPC ............. *F01N 3/28* (2013.01); *B01D 53/885* (2013.01); *B25J 15/0028* (2013.01); *F01N 3/2814* (2013.01); *F01N 3/2842* (2013.01); *F01N 13/017* (2014.06); *F01N 13/185* (2013.01); *F01N 13/1855* (2013.01); *B01J 35/02* (2013.01); *B01J 35/04* (2013.01); *B01J 37/0215* (2013.01); *F01N 2350/00* (2013.01); *F01N 2450/30* (2013.01); *F01N 2590/02* (2013.01); *F01N 2590/10* (2013.01)

(58) Field of Classification Search
CPC ...... F01N 3/2842; F01N 3/28; F01N 13/1855; F01N 2590/10; B01D 35/02; B01D 53/885
USPC .................................................. 422/177, 180
See application file for complete search history.

(56) References Cited

U.S. PATENT DOCUMENTS 4,849,185 A * 7/1989 Wittig .................... B01D 53/86
34/242

FOREIGN PATENT DOCUMENTS

| DE | 3519731 A1 | 12/1986 |
|---|---|---|
| DE | 3706086 A1 | 9/1988 |

(Continued)

*Primary Examiner* — Tom P Duong

(57) ABSTRACT

The catalytic converter apparatus has at least one element box which extends in a longitudinal direction and which has a first pair of first side walls which lie opposite one another, and a second pair of second side walls which lie opposite one another, and two open end sides which lie opposite one another in the longitudinal direction. A plurality of catalytic converter plates are arranged in the element box, which catalytic converter plates are oriented parallel to the first side walls, merely one part of the side walls having a rail which extends transversely with respect to the longitudinal direction on at least one of the end sides, on which rail the catalytic converter plates are supported. As a result, the flow properties of the element box are improved and the risk of dust deposits is avoided.

15 Claims, 4 Drawing Sheets

(56) References Cited

FOREIGN PATENT DOCUMENTS

Figure 3:
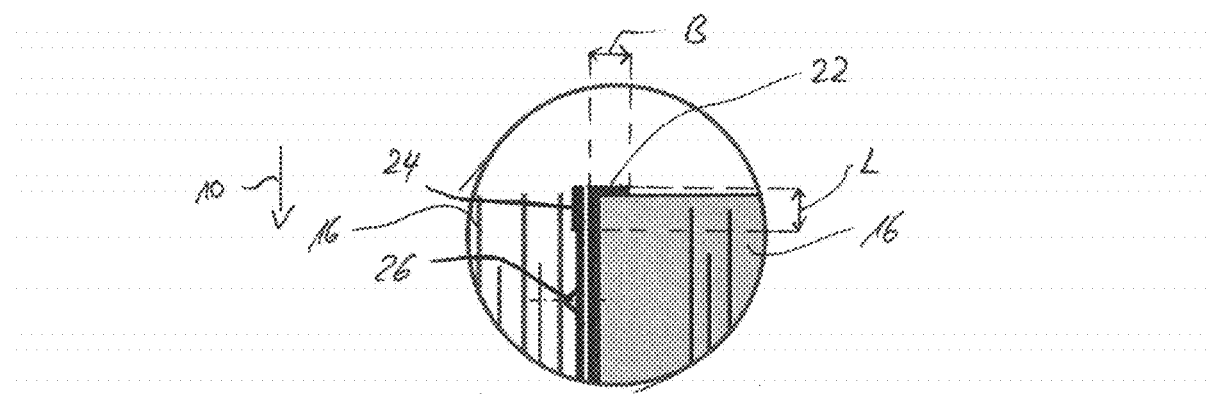

| | | |
|---|---|---|
| DE | 3825958 A1 | 2/1990 |
| DE | 4104220 A1 | 8/1992 |
| DE | 19647400 A1 | 5/1998 |
| DE | 19929765 A1 | 1/2001 |
| JP | 2002239345 A | 8/2002 |
| JP | 2010253366 A | 11/2010 |

* cited by examiner

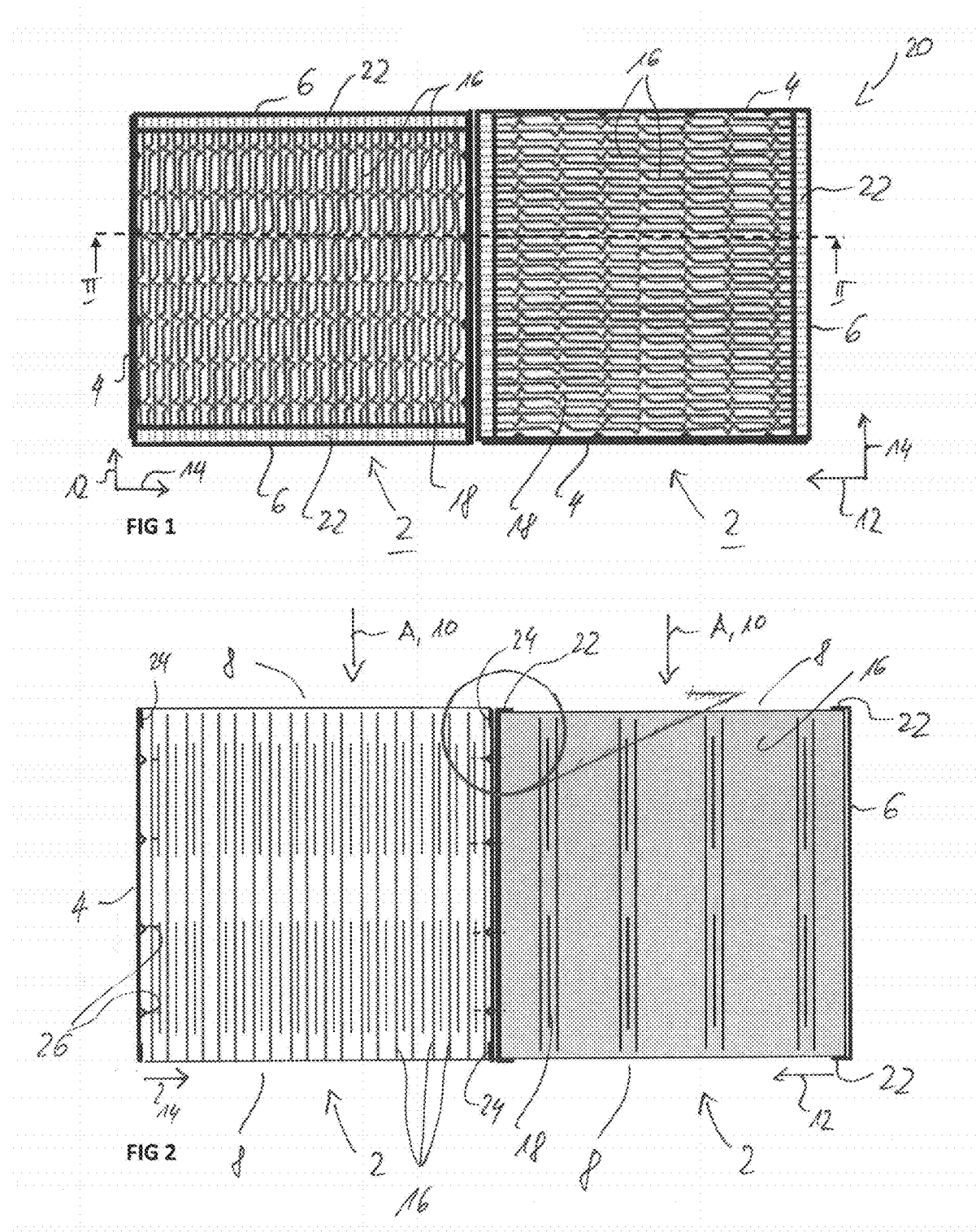

CATALYST DEVICE, ELEMENT BOX FOR A CATALYTIC DEVICE, AND HANDLING TOOL FOR HANDLING THE ELEMENT BOX

CROSS-REFERENCE TO RELATED APPLICATIONS

This application claims priority to German Patent Application No. DE 10 2014 203 748.4, filed on Feb. 28, 2014, and is incorporated herein by reference.

The invention relates to a catalytic converter apparatus which has at least one element box which extends in a longitudinal direction and has a first pair of first side walls which lie opposite one another, a second pair of second side walls which lie opposite one another, and two open end sides which lie opposite one another in the longitudinal direction, namely an inlet side and an outlet side for an exhaust gas to be purified, a plurality of catalytic converter plates being arranged in the element box, which catalytic converter plates are oriented parallel to the first side walls. Furthermore, the invention relates to an element box of this type for a catalytic converter apparatus of this type, and to a handling tool for an element box of this type.

An element box of this type can be gathered, for example, from DE 196 47 400 A1. A multiplicity of individual catalytic converter plates are typically arranged next to one another in an element box of this type. Here, the catalytic converter plates are usually provided with a catalytically active coating or are composed overall of a catalytically active material.

Element boxes of this type are frequently used in exhaust gas purification systems of stationary combustion systems. To this end, a multiplicity of element boxes of this type are typically arranged next to one another and form what is known as a catalytic converter module. Here, a plurality of modules of this type can be arranged in a plurality of layers one behind another in a flow direction of an exhaust gas to be purified. Here, a catalytic converter module of this type typically covers the entire flow cross section of the exhaust gas duct which is frequently several tens of square meters.

Stationary combustion system is understood to mean any system for combusting hydrocarbon-based fuels. They can be, for example, coal-fired or oil (petroleum)-fired systems or gas turbines. Stationary combustion systems also comprise marine applications, for example combustion systems such as diesel engines, as are used for large container or cruise ships. The stationary combustion systems are usually operated continuously under an identical, steady-state load.

An exhaust gas purification system of this type can be gathered, for example, from DE 199 29 765 A1.

Catalytic converter apparatuses of this type, also called plate catalytic converter apparatus in the following text, are also used, in particular, for nitrogen oxide reduction, for example according to the principle of selective catalytic reduction (SCR method). In this method, nitrogen oxides are converted to nitrogen and water with the aid of the catalytic converter apparatus in the presence of ammonia in a manner which is known per se.

In catalytic converter apparatuses of this type, firstly a catalytically active surface which is as large as possible is desired here, and at the same time the aim is a flow resistance which is as low as possible for the exhaust gas to be purified. During operation, for example on account of dead zones or eddying, there is the risk that dust contents in the exhaust gas are deposited on the catalytic converter apparatus and therefore lead to gradual clogging of the flow paths which are formed through the individual catalytic converter plates.

The element boxes are usually approximately rectangular or cube-shaped sheet metal boxes with closed side walls and open end sides which lie opposite one another. During operation, the exhaust gas flows through the element boxes in the longitudinal direction, one open end side forming an inlet side and the other open end side forming an outlet side. The element boxes which are manufactured from sheet metal are nowadays provided in each case with 90° flanged edges on the end sides which lie opposite one another in order to reinforce the element boxes and in order to make handling of element boxes of this type unproblematic, for example during fitting of a module or else for overhaul purposes. A respective side wall is therefore bent over in each case by 90° in the region of its end edges which lie opposite one another, that is to say an edge strip of the side wall is bent over approximately at right angles. In addition to a reinforcement of the entire element box, a type of holding rail is also formed as a result, between which individual catalytic converter plates are held in the element box.

Proceeding herefrom, the invention is based on the object of specifying a catalytic converter apparatus with element boxes of this type, in which catalytic converter apparatus satisfactory flow properties are achieved during operation, and in which catalytic converter apparatus the risk of dust deposits is reduced. Furthermore, the invention is based on the object of specifying an element box and a handling unit for an element box of this type, in order to make simple handling possible.

According to the invention, the object with regard to the catalytic converter apparatus is achieved by way of a catalytic converter apparatus which comprises at least one element box which extends in the longitudinal direction and which has a first pair of first side walls which lie opposite one another, a second pair of second side walls which lie opposite one another, and two open end sides which lie opposite one another in the longitudinal direction, namely an inlet side and an outlet side. During operation, the element box is flowed through in the longitudinal direction by an exhaust gas to be purified from the inlet side to the outlet side. A plurality of catalytic converter plates are arranged in the element box, which catalytic converter plates are oriented parallel to the first pair of side walls which lie opposite one another. The catalytic converter apparatus is therefore overall a plate catalytic converter apparatus.

Here, the element box is usually configured as a sheet metal box. The individual side walls are therefore configured from sheet metal. In order to improve the flow properties in comparison with the conventional element boxes with the side walls with flanged edges, it is provided then that merely some of the side walls have a rail which extends transversely with respect to the longitudinal direction on at least one of the end sides. The catalytic converter plates are usually supported on the said rail. The at least one radially inwardly protruding rail protrudes at least beyond the catalytic converter plates at their edges, with the result that the catalytic converter plates are secured in the flow direction. The rails therefore form, in particular, holding rails for the catalytic converter plates. Here, the rail is preferably configured by way of a flanged edge, in particular a 90° bent-over portion of an end edge of a respective side wall. Furthermore, it is preferably provided that the rail and therefore the flanged edges are formed merely on the side walls of the second pair, with respect to which the individual catalytic converter plates are therefore oriented perpendicularly.

The measure, according to which merely one part of the side walls has rails or flanged edges of this type which are oriented approximately at right angles to the side walls on account of their design and therefore partially cover the free flow space of the element box, achieves the advantage that the free flow area of a respective element box is increased. In comparison with the conventional element boxes with a total of eight flanged edges, this leads to an increase in the free flow cross-sectional area and therefore to an increase in the catalytic purification efficiency which is typically correlated with the increase in the free flow cross-sectional area and therefore lies, for example, in the range of several percent. In the conventional element boxes, the flanged edges on the side walls which run parallel to the catalytic converter plates had partially covered complete catalytic converter plates which were therefore not able to contribute to the purification effect.

Considerably improved efficiency and utilization of the catalytic converter plates used in the element boxes are therefore achieved by way of the solution which is now proposed.

Moreover, an improved flow behaviour of the exhaust gas during operation also arises, as a result of which the risk of deposits on the flow ducts which are formed between the catalytic converter plates is reduced. In particular in an edge region between two element boxes which adjoin one another, the conventional design variant with the flanged edges led to a comparatively high flow resistance, since a comparatively large dead space had been formed.

In one expedient development, at least one first side wall of the first pair of the first side walls which lie opposite one another has a strip-shaped reinforcing rail in the region of at least one of the end sides, which reinforcing rail bears flatly against the side wall. The said reinforcing rail is expediently formed by way of a 180° bent-over portion of an end edge of the respective side wall. This measure achieves an improvement in the rigidity of the entire element box, without the flow properties being reduced. Here, the reinforcing rail preferably extends over the entire width of the respective first side walls which are therefore oriented parallel to the catalytic converter plates. Here, the bent-over portions are optionally configured inwards into the interior of the element box or else outwards.

Overall, a respective element box therefore has 90° bent-over portions in each case on the end edges on its second side walls which are oriented perpendicularly with respect to the catalytic converter plates, with the result that a total of four 90° bent-over portions are formed. The catalytic converter plates are supported in each case by way of end sections on the said bent-over portions, and they are therefore held reliably in each case between bent-over portions which lie opposite one another. At the same time, the two first side walls likewise have 180° bent-over portions in each case on their end edges which lie opposite one another, with the result that a total of four 180° bent-over portions are also formed here for reinforcement purposes. Here, the individual catalytic converter plates extend over the entire length of the element box between the rails/bent-over portions which lie opposite one another. Furthermore, they have a width which corresponds substantially to the inner width of the element box apart from a possibly necessary gap size.

The individual catalytic converter plates are lined up in a row next to one another with flow paths being left free for the exhaust gas to be purified. Here, the individual catalytic converter plates usually form protuberances in the manner of ribs and beads, via which they are held alternately at a defined spacing from one another.

Furthermore, at least one spacer element is expediently formed on at least one of the first side walls which run parallel to the catalytic converter plates, with the result that a catalytic converter plate which adjoins the said first side wall is supported on the said spacer element. Both first side walls which lie opposite one another expediently have spacer elements of this type. The spacer elements are preferably formed by protuberances of the side wall, that is to say by protuberances or reshaped portions of the sheet metal side wall. The protuberances are, for example, ribs or else bent-out punched portions or else round protuberances.

The catalytic converter apparatus usually has a multiplicity of element boxes of this type which together form one module. Here, the individual element boxes are arranged so as to adjoin one another directly both in rows and in columns.

Here, unfavourable conditions during operation can lead to undesired oscillations which lead, for example, to noise pollution or else to high mechanical loading as far as to damage of individual catalytic converter plates.

In order to avoid undesired oscillations of this type, a catalytic converter apparatus is then provided according to the invention, in which element boxes which are adjacent to one another are rotated in each case by 90° with respect to one another, with the result that the catalytic converter plates of one element box which are arranged in the respective element box are therefore oriented perpendicularly with respect to those of the adjacent element box. Possible vibrations of the catalytic converter plates of one element box are therefore damped directly as a result of the orientation of the adjacent element boxes which is rotated by 90°, with the result that undesired oscillations do not occur in the entire module. As a result, the risk of damage of catalytic converter plates can be at least reduced.

The refinement with the rotated arrangement of the element boxes with respect to one another is an independent refinement according to the invention which can also be implemented independently of the combination of features of claim 1. The submission of a divisional application in this regard remains reserved. However, the element boxes which have the rails only on a part of the side walls are preferably likewise used for this purpose.

In this design variant, in which element boxes have the 90° flanged edges merely on the second side walls, the particular advantage of additional reinforcement is additionally achieved by way of this rotated arrangement in each case by 90°, with the result that the mechanical stability of the arrangement of the element boxes is improved additionally as a result.

In the previous element boxes, despite the total of eight flanged edges on each of the eight edge sides of the element boxes, there was the problem that the element boxes were damaged, by being bent, for example, and therefore no longer being usable, during handling of the element boxes, for example during insertion into a module or else during an overhaul for removal from the module.

In order to solve this problem, furthermore, a handling concept is then provided according to the invention firstly with specially configured element boxes in conjunction secondly with a specially configured handling tool. This problem is therefore solved according to the invention by way of a catalytic converter apparatus which has at least one element box which extends in a longitudinal direction and which has a first pair of first side walls which lie opposite one another, a second pair of second side walls which lie opposite one another, and two open end sides which lie opposite one another in the longitudinal direction, at least one of the pairs of the side walls which lie opposite one another having first gripping elements on the side faces of the element box which are formed by the side walls, which first gripping elements can be gripped in a positively locking manner by the handling tool.

Furthermore, the object is achieved by way of a handling tool of this type for handling the specially configured element box. The handling unit has two gripping arms which lie opposite one another and on which in each case second gripping elements are arranged which are configured for gripping the first gripping elements of the element box in a positively locking manner. This handling concept is in turn considered to be an independently inventive concept, independently of the specific refinement of the element box with the rails which are formed only on some side walls. The submission of a divisional application in this respect remains reserved. The element box is preferably configured as described above, however.

With regard to the novel handling concept, at least one of the two pairs of side walls which lie opposite one another has first gripping elements on the side faces, which gripping elements can be gripped by the handling tool in a positively locking manner. Here, they are expediently holes which are made in the side wall. In general, the gripping elements are therefore made as additional elements on the side face. As a result, reliable and gentle gripping is made possible in the surface region of the side walls.

Furthermore, it is expediently provided here that the said first gripping elements are arranged in a pattern which has a 90° rotational symmetry. The individual gripping elements are therefore arranged at the corner points of a square and are in each case at the same spacing from one another. This provides the possibility of gripping the element box from any desired side with one and the same handling tool. The pattern is therefore expediently also configured at least largely centrally within the respective side wall, with the result that the individual gripping elements are preferably at in each case the same spacing from an edge of the element box.

The corresponding handling tool according to the invention comprises two gripping arms which lie opposite one another and on which in each case second gripping elements are arranged which are configured for gripping the first gripping elements of the element box in a positively locking manner. The second gripping elements therefore engage behind the first gripping elements in the longitudinal direction and in one of the two transverse directions, with the result that a positively locking connection which acts in the said directions is configured. Here, the second gripping elements are expediently of pin-like configuration, in order to be able to engage into the first gripping elements of the element box which are configured as holes. In principle, the arrangement of elements which protrude in a pin-like manner on the element box is also possible, but the packaging density within a module is influenced as a result, with the result that the holes are preferably provided which do not influence the packaging density in the module.

Here, the holes preferably have a hole width which is larger than the second gripping elements of the handling tool, with the result that the said handling tool can be introduced easily into the holes. Here, the gripping elements are expediently of conical configuration, with the result that, in the inserted state, they form a type of undercut with walls of the holes, with the result that the element box is gripped reliably.

The gripping arms which lie opposite one another serve in general to make it possible for the second gripping elements to engage on side walls of the element box which lie opposite one another. Here, the gripping arms are fastened to a crossmember such that they lie opposite one another in a transverse direction. Here, the second gripping elements are expediently arranged such that they can be displaced in the transverse direction relative to one another counter to a spring force. It is provided here according to one preferred variant that the gripping arms per se are arranged displaceably on the crossmember, with the result that the gripping elements which are fastened to the gripping arms can be displaced together with the gripping arms relative to one another counter to the spring force. As an alternative, there is also the possibility that the individual gripping elements themselves are spring-mounted, for example on a holder of the gripping arm. Here, the gripping arm is preferably in each case an element which is, for example, plate-shaped and to which the gripping elements are fastened, for example by way of welding. As a result of the displaceability of the gripping elements or the entire gripping arms relative to one another along the crossmember, the engaging of the gripping elements into the corresponding holes is made possible by a relative displacement between the first and the second gripping elements in the transverse direction. At the same time, the first and second gripping elements are pressed against one another in a spring-loaded manner, with the result that the first and second gripping elements engage into one another automatically in order to form the positively locking connection, as soon as they are arranged so as to lie opposite one another. They are also held in this positively locking position reliably by way of the spring force. Reliable gripping is ensured as a result.

It is necessary for some handling operations that the element boxes are rotated by 90°. In order to make this possible in a simple way, the crossmember or a grip element for gripping the handling tool can preferably be rotated about the transverse direction.

Furthermore, the object of the invention is achieved by way of an element box for a catalytic converter apparatus. Here, the element box extends in a longitudinal direction and has a first pair of first side walls which lie opposite one another, a second pair of second side walls which lie opposite one another, and two open end sides which lie opposite one another in the longitudinal direction, a plurality of catalytic converter plates being arranged in the element box, which catalytic converter plates are oriented parallel to the first side walls, merely one part of the side walls having a rail which extends transversely with respect to the longitudinal direction on at least one of the end sides, on which rails the catalytic converter plates are supported. The advantages and preferred refinements mentioned with regard to the catalytic converter apparatus can also be transferred analogously to the said element box.

Figure 4:
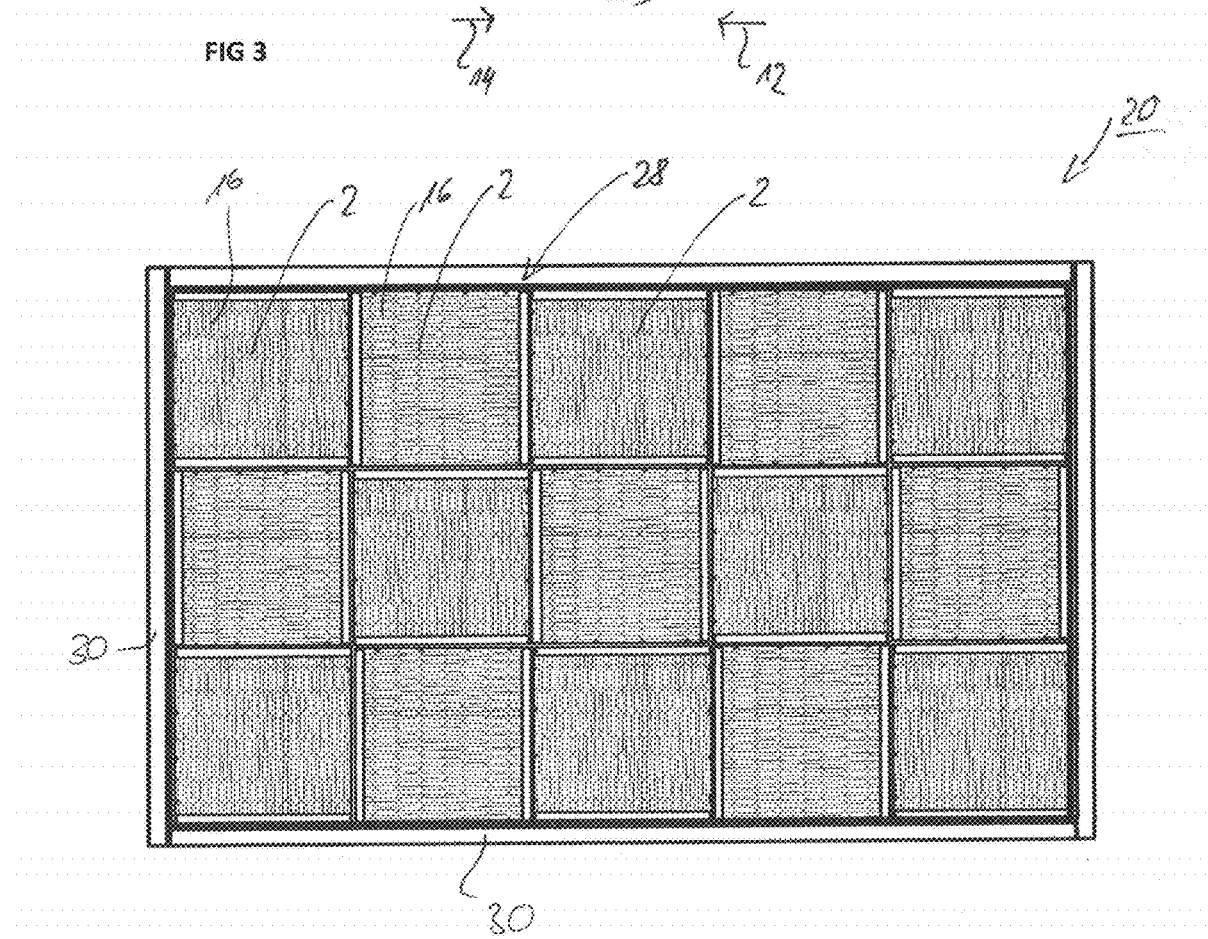
Figure 5:
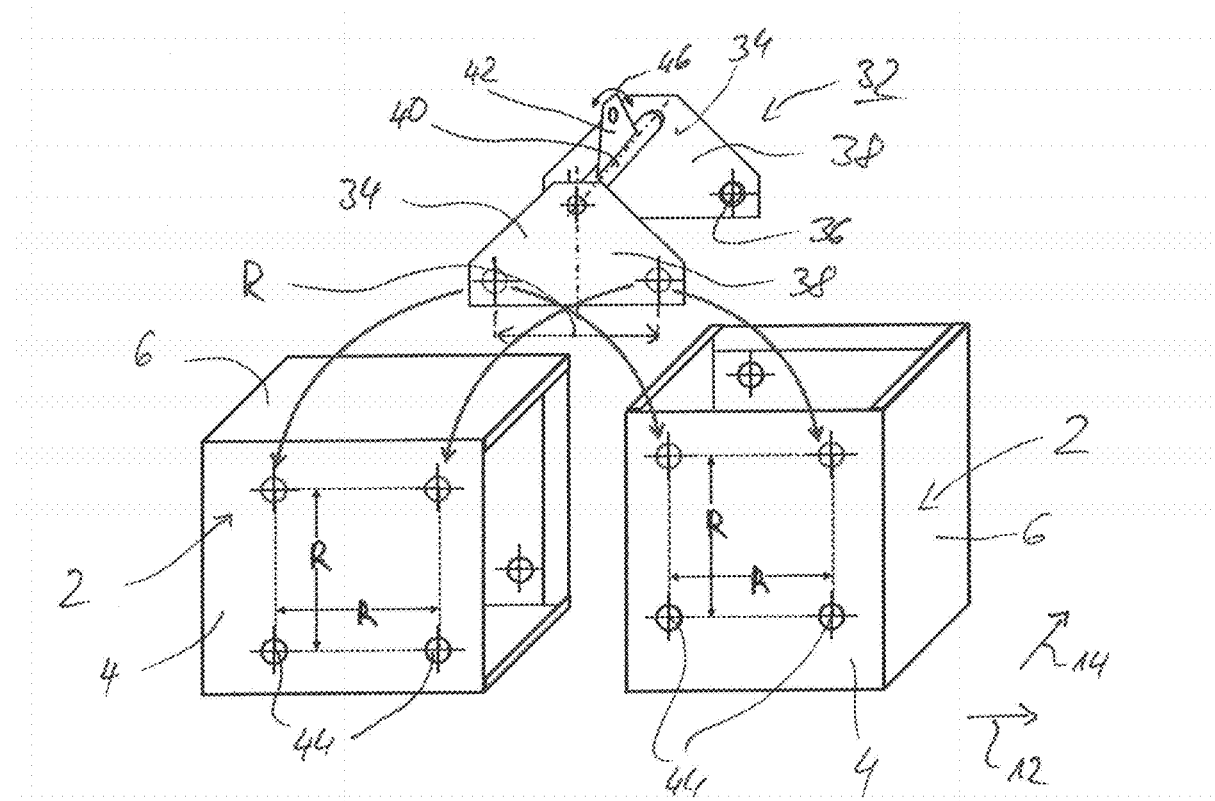
Figure 6:
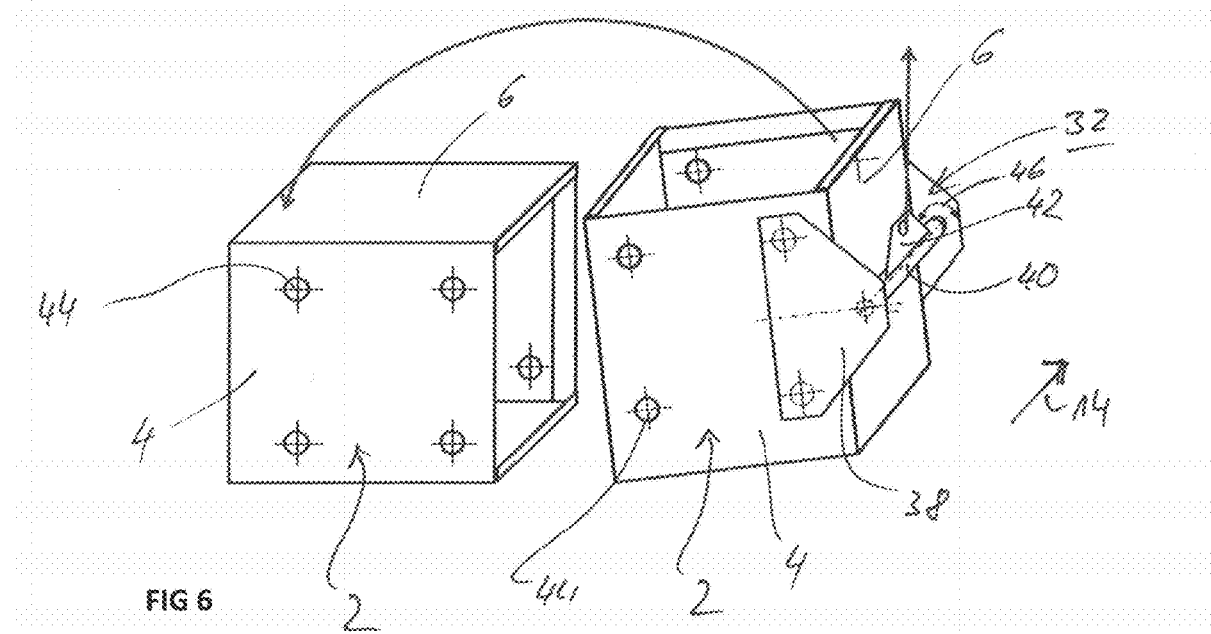
Figure 7:
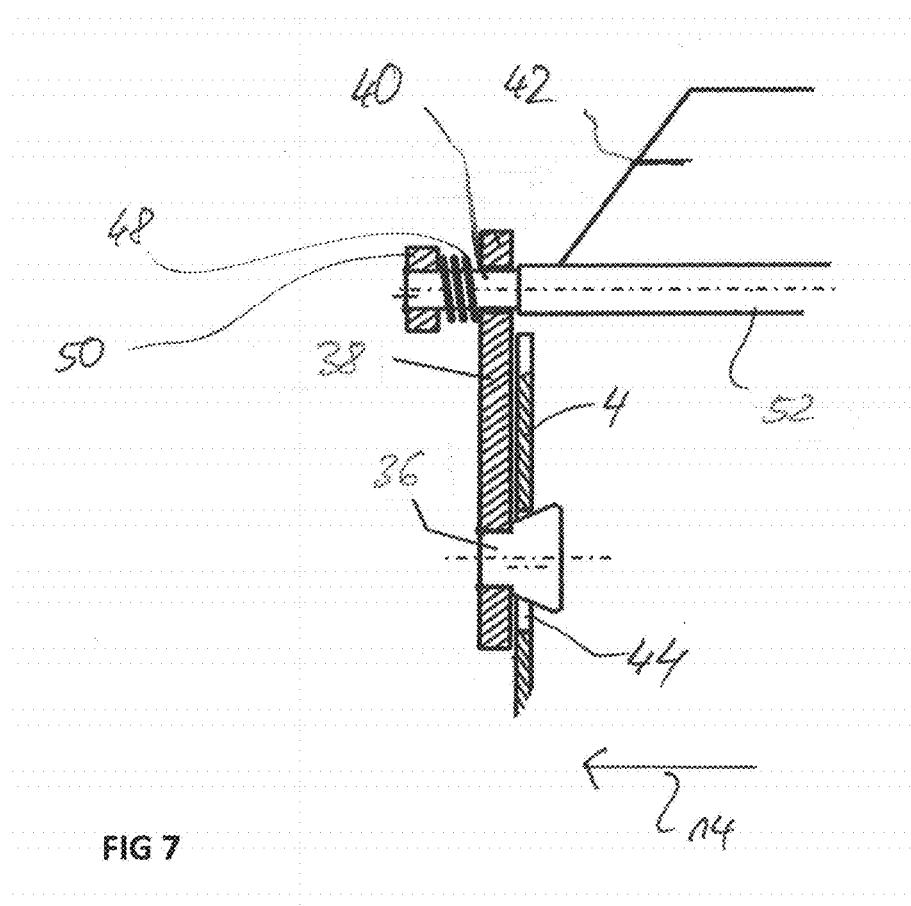

One exemplary embodiment of the invention will be explained in greater detail in the following text using the figures, in which, partially in simplified illustrations:

FIG. 1 shows a view of two element boxes which are rotated by 90° with respect to one another, FIG. 2 shows a sectional view along the sectional line II-II in FIG. 1, FIG. 3 shows an enlarged illustration of the region which is identified by a circle in FIG. 2, FIG. 4 shows a view of a catalytic converter module with a multiplicity of element boxes arranged therein, FIG. 5 shows an illustration of two element boxes and a handling tool for illustrating the handling of the element boxes, FIG. 6 shows two element boxes with a handling tool for illustrating the rotation by 90° of an element box, and FIG. 7 shows details of an enlarged sectional illustration of the handling unit in the region of a gripping arm.

Identically functioning parts are shown using the same reference numerals in the figures.

As can be seen using FIGS. 1 to 3, a respective element box 2 comprises a first pair of first side walls 4 and a second pair of second side walls 6. The respective side walls 4, 6 which are arranged in pairs lie opposite one another and enclose a rectangle and, in particular, a cube-shaped interior between them. The side walls 4, 6 are sheet metal walls. A total of four side walls 4, 6 are formed, for example, by way of bending over and welding an elongate sheet metal strip. Furthermore, the element box 2 has two open end sides 8 which lie opposite one another, with the result that the respective element box 2 is open in a longitudinal direction 10 and can be flowed through during operation by an exhaust gas A to be purified. A respective element box 2 extends along the first side walls 4 in a first transverse direction 12 and along the second side walls 12 along a second transverse direction 14.

A multiplicity of catalytic converter plates 16 are arranged within the element box 2, which catalytic converter plates 16 extend substantially parallel to the first side walls 4 and in the longitudinal direction 10. Here, substantially parallel is understood to mean that the catalytic converter plates 16 are not configured completely as planar plates, but rather usually have ribs 18, by way of which they are supported alternately on one another. Flow paths for the exhaust gas A to be purified are configured between the individual catalytic converter plates 16 in the longitudinal direction 10. The catalytic converter plates 16 are provided with a catalytically active coating.

The element boxes 2 with the catalytic converter plates 16 form a catalytic converter apparatus 20 which is shown in each case only in details in the figures and which is configured, in particular, for nitrogen oxide reduction of nitrogen oxides in the exhaust gas A according to the principle of selective catalytic reduction.

The catalytic converter plates 16 are held within a respective element box by rails 22 which extend along the second transverse direction. Here, the rails 22 are formed by 90° flanged edges, that is to say of the second side walls 6. Here, a 90° flanged edge is understood as usual to mean a bent-over portion of end edges of the second side walls 6. Here, the rails 22 which are formed by a 90° bent-over portion are formed on both open end sides 8 which lie opposite one another, that is to say on end edges which lie opposite one another on each of the two second side walls 6. The bent-over portions extend, in particular, over the entire length of the second side walls 6 in the second transverse direction. In contrast, 90° bent-over portions of this type are missing on the first side walls 4. Reinforcing rails 24 are formed on the said first side walls 4. The said reinforcing rails 24 are configured, in a similar manner to the rails 22 on each of the first side walls 4, on end edges which lie opposite one another in the region of the open end sides 8. They are preferably formed by 180° bent-over portions of the said end edges.

The reinforcing rails 24 are generally of strip-shaped configuration and bear flatly against the side wall 4, with the result that they reach into the free interior of the element box 2 only by the thickness of the sheet metal and therefore form only a low flow resistance. In addition, as a result of the 180° bent-over portion, a round end edge which is oriented towards the open end side 8 is formed in a suitable way, which end edge is advantageous in terms of flow.

Here, the length L of the reinforcing rail 24 in the longitudinal direction 10 also corresponds, in particular, to the width B of the rail 22 in the direction of the first transverse direction 12, since both elements 22, 24 are formed by bending over of a sheet metal element with an identical length. The thickness of the reinforcing rail 24 is generally considerably smaller than the width B of the rail 22, in particular smaller than 50% and preferably smaller than 20% of the width B. It corresponds, in particular, merely to the sheet metal thickness of the side walls 4, 6.

As also results, in particular, from FIG. 2 and FIG. 3, a plurality of spacer elements 26 which are preferably configured as inwardly bent protuberances are arranged on the first side walls 4. Here, they are preferably configured as circular and therefore approximately punctiform inwardly directed protuberances.

The catalytic converter plates 16 extend in the longitudinal direction 10 over the entire length L of the respective element box 2 and lie by way of end regions on the rails 22. They are therefore held or supported on their respective front end sides between the rails 22 which lie opposite one another, and are therefore held reliably within the element box 2.

An improvement in the efficiency of the exhaust gas purification is achieved during operation by way of this special design variant (shown in FIGS. 1 to 3) with the rails 22 which are formed merely on the second side walls 6. In comparison to a refinement, in which the element boxes have rails 22 of this type on all side walls 4, 6, an improvement in the efficiency of the exhaust gas purification of several percent is achieved. In the case of an identical number of catalytic converter plates 16, an increased purification effect, for example, is achieved, that is to say a higher nitrogen oxide reduction, for example. This is achieved by way of the enlarged free incident flow cross section which is enlarged by approximately 4%, for example, in comparison with conventional element boxes which have bent-over portions on all eight side edges. As a result of the enlarged free incident flow cross section in the region of the first side walls 4, the catalytic converter plates 16 which are arranged in the said edge regions also contribute to the purification. A further advantage is to be seen in the relatively small pressure loss and the relatively low risk of dust deposits and therefore also the reduced risk that flow paths become clogged. Overall, an improved purification efficiency can be achieved as a result in comparison with conventional systems of identical overall size, or only a reduced overall size is required for an identical purification efficiency, which leads to cost savings.

A multiplicity of element boxes 2 of this type are usually combined to form a module 28, as shown in FIG. 4. A module 28 of this type comprises a holding frame 30, in which a multiplicity of element boxes 2 are held which are arranged therein so as to adjoin one another directly in rows and columns.

As becomes clear using the illustration in FIG. 4, the individual element boxes 2 are arranged offset in each case by 90° with respect to one another, with the result that in each case first side walls 4 of one element box 2 therefore bear against second side walls 6 of an adjacent element box. The catalytic converter plates 16 of adjacent element boxes 2 are therefore rotated by 90° with regard to the longitudinal direction 10 with respect to one another.

Several advantages are achieved by way of this special arrangement. Firstly, an increased stability of the entire arrangement arises as a result. Furthermore, this leads to improved sealing of the intermediate spaces between adjacent element boxes 2, with the result that no leakage flows or only low leakage flows flow between them. The arrangement with the catalytic converter plates 16 which are rotated by 90° also leads to improved flow guidance of the entire exhaust gas stream over the entire flow cross-sectional area of the module 28. Here, the catalytic converter plate pattern which is formed by this arrangement assists a desired homogenization of the exhaust gas stream.

Moreover, a further decisive advantage of this arrangement is to be seen in the fact that vibrations which can occur during operation while the exhaust gas A is flowing through are damped within the module 28 as a consequence of the alternately rotated arrangement of the element boxes 2. Vibrations of one element box 2 are damped directly on account of the rotated arrangement of the adjacent element boxes 2 and critical oscillation excitation is avoided and therefore the risk of damage of catalytic converter plates 16 is reduced considerably.

During operation, a plurality of modules 28 of this type are arranged in order to form the entire catalytic converter apparatus 20 within an exhaust gas duct of a stationary combustion system. Here, the module 28 can cover the entire cross-sectional area of the flue gas duct, or a plurality of modules 28 of this type are inserted into the flue gas duct in a plane perpendicularly with respect to the flow direction of the exhaust gas A. A plurality of module layers of this type are typically inserted one behind another in the flow direction of the exhaust gas A.

In order to facilitate handling of the element boxes 2 which is as comfortable as possible with simultaneous gentle treatment of the element boxes 2, firstly a special handling tool 32 is configured which interacts in a suitable way with specially prepared element boxes 2, as is explained in greater detail in the following text using FIGS. 5 to 7:

The handling tool 32 has two gripping arms 34 which lie opposite one another and in each case comprise two second gripping elements 36 which are configured in the manner of pins which therefore extend in the direction of the second transverse direction. Here, the second gripping elements 36 are fastened to a support plate 38 of the gripping arm 34, for example by being pressed in, by welding, etc. The support plates 38 preferably in each case have an approximately triangular geometry.

Here, the two second gripping elements 36 are arranged in each case on the long triangle side at a grid spacing R. The two gripping arms 34 are connected to one another via a crossmember 40 which is configured in the manner of a rod. Furthermore, a grip element 42 is arranged approximately centrally on the crossmember 40, via which grip element 42 the entire handling tool 32 can be gripped and actuated.

In a corresponding manner to the second gripping elements 36, the element boxes 2 have first gripping elements which are configured in the manner of holes 44. Here, the said holes 44 are configured in each case in side walls 4, 6 which lie opposite one another and, to be precise, in the first side walls 4 which lie opposite one another, in particular. At least two holes 44 are configured which are likewise arranged in the grid dimension R with respect to one another. As shown in FIGS. 5 and 6, a plurality of holes 44 are preferably arranged here which form a pattern which is rotationally symmetrical by 90°. A total of preferably four holes 44 are therefore arranged at the corner points of a square with an edge length R. As a result of this measure, the element box 2 can be gripped without problem independently of its respective position, as shown in FIG. 5.

As a result of the special configuration of the handling tool 32, simple rotation of the respective element box 2 by 90° about one of the transverse directions 12, 14 is also made possible, depending on which of the side walls 4, 6 the holes 44 are configured and the second gripping elements 36 engage. In the exemplary embodiment, a rotation about the second transverse direction 14 is made possible. To this end, the crossmember 40 itself which extends along the second transverse direction 14 can be rotated about an axis which is oriented parallel to the second transverse direction 14, as shown by the arrow 46 in FIG. 6.

The spacing of the two gripping arms 34 corresponds substantially to the spacing of the first side walls 4 which lie opposite one another, with the result that the support plates 38 in each case bear against the said side walls 4 during the handling operation. At the same time, the second gripping elements 36 engage into the holes 44. This results, in particular, from the sectional illustration in details of FIG. 7. It can be seen in the said figure that the second gripping elements 36 which are configured in the manner of pins are plugged into a respective support plate 38 and are fastened there. The fastening takes place, for example, by way of a press fit, by way of welding or adhesive bonding, etc. In the handling state, the gripping elements 36 are guided through the respectively associated holes 44. As can be seen clearly using FIG. 7, the second gripping element 36 is configured here in the manner of a conically widening pin, with the result that a positively locking connection is also achieved with the first side wall 4 in the direction of the second transverse direction 14 in the handling state, in order in this way to ensure reliable handling of the element box 2.

Furthermore, it can be seen using FIG. 7 that the support plate 38 is arranged such that it can be displaced on the crossmember 40 in the direction of the second transverse direction 14 counter to the spring force of a spring element 48. Here, the spring element 48 is guided around the rod-shaped crossmember 40 in the manner of a helical spring and is clamped in between an end-side holding ring 50 and the support plate 38. As a result, the support plate 38 can be displaced outwards somewhat for mounting and for introducing the second gripping elements 36 into the holes 44. As soon as the holes 44 are reached, the second gripping elements 36 then preferably automatically snap into the said holes 44. In the design variant of FIG. 7, the spring element 48 is arranged on the outer side, with the result that the spring force is directed from the outside onto the first side walls 4 and therefore a clamping force is exerted on the side walls 4 via the support plate 38. As an alternative, there is also the reverse design variant, in which the support plates 38 are pressed against the inner side of the first side walls 4.

Furthermore, it can be seen in FIG. 7 that the grip element 42 has a sleeve element 52 which is configured in the manner of a tube which is pushed concentrically over the crossmember 40, in order to enable the rotational movability of the grip element 42. The crossmember 40 is likewise configured, for example, as a circular tube or as a solid circular rod. It is fixed in a rotationally fixed manner on the support plates 38, for example by way of pressing in, welding, etc.

LIST OF REFERENCE NUMERALS

2 Element box
4 First side wall
6 Second side wall

8 End side
10 Longitudinal direction
12 First transverse direction
14 Second transverse direction
16 Catalytic converter plate
18 Rib
20 Catalytic converter apparatus
22 Rail
24 Reinforcing rail
26 Spacer element
28 Module
30 Holding frame
32 Handling tool
34 Gripping arm
36 Second gripping element 50 Holder
38 Support plate 52 Sleeve element
40 Crossmember A Exhaust gas
42 Grip element L Length
44 First gripping element/holes B Width
46 Arrow R Grid spacing
48 Spring element

The invention claimed is:

1. A catalytic converter apparatus comprising at least one element box which extends in a longitudinal direction and has a first pair of first side walls which lie opposite one another, a second pair of second side walls which lie opposite one another, and two open end sides which lie opposite one another in the longitudinal direction, an inlet side and an outlet side, a plurality of catalytic converter plates arranged in the element box, where the catalytic converter plates are oriented parallel to the first side walls, and merely one part of the side walls has a rail which extends transversely with respect to the longitudinal direction on at least one of the end sides,
where the at least one element box includes at least one of the pairs of side walls having first gripping elements on the side faces of the element box which are formed by the side walls, which first gripping elements can be gripped in a positively locking manner by a handling tool.

2. The catalytic converter apparatus according to claim 1, where the rails are formed merely on the second side walls.

3. The catalytic converter apparatus according to claim 1, where the rail is a bent-over portion of a respective side wall.

4. The catalytic converter apparatus according to claim 1, where at least one of the first side walls has a strip-shaped reinforcing rail in the region of at least one of the end sides, and the reinforcing rail bears flatly against the first side wall.

5. The catalytic converter apparatus according to claim 4, where the reinforcing rail is a 180° bent-over portion of a respective side wall.

6. The catalytic converter apparatus according to claim 1, where both second side walls have 90° bent-over portions that form the rails on the end sides which lie opposite one another, and the two first side walls have 180° bent-over portions that form reinforcing rails on the end sides which lie opposite one another.

7. The catalytic converter apparatus according to claim 1, where spacer elements are arranged on at least one of the first side walls for a catalytic converter plate which adjoins the said first side wall, which spacer elements are formed, in particular, by protuberances of the first side wall.

8. The catalytic converter apparatus, according to claim 1, having a plurality of element boxes which extend in each case in a longitudinal direction and which in each case have a first pair of first side walls which lie opposite one another, a second pair of second side walls which lie opposite one another, and two open end sides which lie opposite one another in the longitudinal direction, a plurality of catalytic converter plates which are oriented parallel to the first side walls being arranged in each element box, where the catalytic converter plates of adjacent element boxes are oriented perpendicularly with respect to one another.

9. Catalytic converter apparatus according to claim 1, where the first gripping elements are holes.

10. Catalytic converter apparatus according to claim 1, where the first gripping elements are arranged in a pattern having 90° rotational symmetry.

11. A handling tool for handling an element box of a catalytic converter apparatus according to claim 1, where the handling tool has two gripping arms which lie opposite one another and on which in each case second gripping elements are arranged which are configured for gripping first gripping elements of the element box in a positively locking manner.

12. The handling tool according to claim 11, where the second gripping elements have a pin-like configuration.

13. The handling tool according to claim 12, where the two gripping arms are fastened to a crossmember so as to lie opposite one another in a transverse direction, the second gripping elements being arranged such that they can be displaced in the transverse direction relative to one another counter to a spring force.

14. The handling tool according to claim 13, where the crossmember or a grip element for gripping the handling tool is rotatable about the transverse direction.

15. An element box for a catalytic converter apparatus according to claim 1, where the element box extends in a longitudinal direction and has a first pair of first side walls which lie opposite one another, a second pair of second side walls which lie opposite one another, and two open end sides which lie opposite one another in the longitudinal direction, a plurality of catalytic converter plates being arranged in the element box, which catalytic converter plates are oriented parallel to the first side walls,
wherein only one part of the side walls has a rail which extends transversely with respect to the longitudinal direction on at least one of the end sides, on which rail the catalytic converter plates are supported.

* * * * *